United States Patent [19]

Uenoyama et al.

[11] Patent Number: 5,319,017
[45] Date of Patent: Jun. 7, 1994

[54] WATER-BASED PAINT COMPOSITION

[75] Inventors: Kazuo Uenoyama, Osaka; Takayuki Shibata, Yawata; Tetsuro Kajino, Ashiya; Masahiro Nagasaki, Nishinomiya; Nobuhiro Sudo, Utsunomiya, all of Japan

[73] Assignee: Nippon Paint Co., Ltd., Osaka, Japan

[21] Appl. No.: 15,406

[22] Filed: Feb. 5, 1993

[30] Foreign Application Priority Data

Feb. 7, 1992 [JP] Japan .................................. 4-21521
Feb. 7, 1992 [JP] Japan .................................. 4-21522

[51] Int. Cl.$^5$ ............................................. C08L 77/10
[52] U.S. Cl. ................................... 524/514; 524/458; 524/460
[58] Field of Search ................. 524/502, 514, 458, 460

[56] References Cited
U.S. PATENT DOCUMENTS 4,981,901 1/1991 Noda et al. ........................ 524/502

FOREIGN PATENT DOCUMENTS 49-51324 5/1974 Japan .

Primary Examiner—Joseph L. Schofer
Assistant Examiner—Jeffrey T. Smith
Attorney, Agent, or Firm—Nikaido Marmelstein Murray & Oram

[57] ABSTRACT

A water-based paint composition suitable for re-use with the retention of the intended coating property when recovered from a flushing water utilized to collect the paint composition remain undeposited on an article in a painting process. The water-based paint composition comprises a water-soluble resin selected from the group consisting of alkyd resin and acrylic resin to have an acid value of 25 to 100, a hydroxyl value of 35 to 200, and a solubility parameter (SP) of 10.0 to 11.0. The paint composition also incorporate a curing agent having a solubility parameter (SP) which is higher than that of the water-soluble resin by 0.5 to 3.0.

2 Claims, 1 Drawing Sheet

WATER-BASED PAINT COMPOSITION

BACKGROUND OF THE INVENTION

1. Field of the Invention

The present invention is directed to a water-based paint composition, and more particularly to a water-based paint composition which is suitable for re-use after being recovered from a flushing water utilized in a coating booth.

2. Description of the Prior Art

In the field of spray-coating an article within a coating booth, a large amount of coating or paint material remain undeposited away from the article and causes a dust of paint material within the booth. Such paint material is collected by the use of flushing water as being dispersed or dissolved therein. As the paint material is recovered in a large amount, disposal of the paint material with the flushing water cause an economical loss of material and even environmental pollution. To avoid this problem, it has been proposed to recover the paint material from the flushing water for re-use as disclosed, for example, in Japanese patent non-examined early publication (KOKAI) NO. 49-51324. The publication discloses a process of recovering a water-based paint composition comprising a water-soluble resin such as alkyd resin and acrylic resin and a pigment from the flushing water by the use of a reverse osmosis or ultra-filtration membrane, in which the paint composition diluted with the flushing water is filtrated through the membrane in order to increase the concentration of the water-soluble resin and the pigment up to a level approximate to an original concentration for recycling of the paint composition.

However, this filtration process fails to successfully recover a water-soluble organic solvent which is normally contained in the water-based paint composition in several percent for dispersing the water-soluble resin in water, because of that the organic solvent will largely pass through the membrane together with the water. With this result, the recovered paint composition suffers from less concentration of the organic solvent which may cause separation or aggregation of the water-soluble resin or vehicle and the pigment during condensation, leaving unacceptable imbibition in a coating with thus recovered paint composition.

In order to eliminate this problem, the water-based paint composition is proposed to have increased water solubility by the incorporation of a water-soluble resin such as alkyd and acrylic resin having high acid and hydroxyl values. However, this scheme is found to pose another drawback of lowering resistance to moisture and hot water, and also lowering shock resistance.

Further, it is noted that because of that the water-based paint composition is unable to adjust drying speed as opposed to solvent-thinned paints, sagging is likely to occur during the application of the paint, particularly in a high humid environment. When sagging is prevailing, it is hard to apply a relatively thick coat by a single coating operation, thereby lowering coating workability. In order to eliminate the sagging of the paint, it has been attempted to incorporate a thickening agent in emulsion form. However, the thickening agent tends to coalesce with time, which may sometimes produce a grainy surface or the like poor coating property.

SUMMARY OF THE INVENTION

The present invention has been accomplished in view of the above problems and has a primary object of providing a water-base paint composition which is capable of preventing separation and coalescence after being recovered and concentrated from the flushing water for re-use with the retention of intended coating property, yet assuring to avoid sagging without necessity of incorporating emulsion of a thickening agent. To achieve the above superior coating characteristics, the water-based paint composition of the present invention is prepared to comprise a water-soluble resin selected from the group consisting of alkyd resin and acrylic resin to have an acid value of 25 to 100, a hydroxyl value of 35 to 200, and a solubility parameter (SP) of 10.0 to 11.0, and incorporate a curing agent having a solubility parameter (SP) which is higher than that of the water-soluble resin by 0.5 to 3.0.

DESCRIPTION OF THE INVENTION

Figure 1:
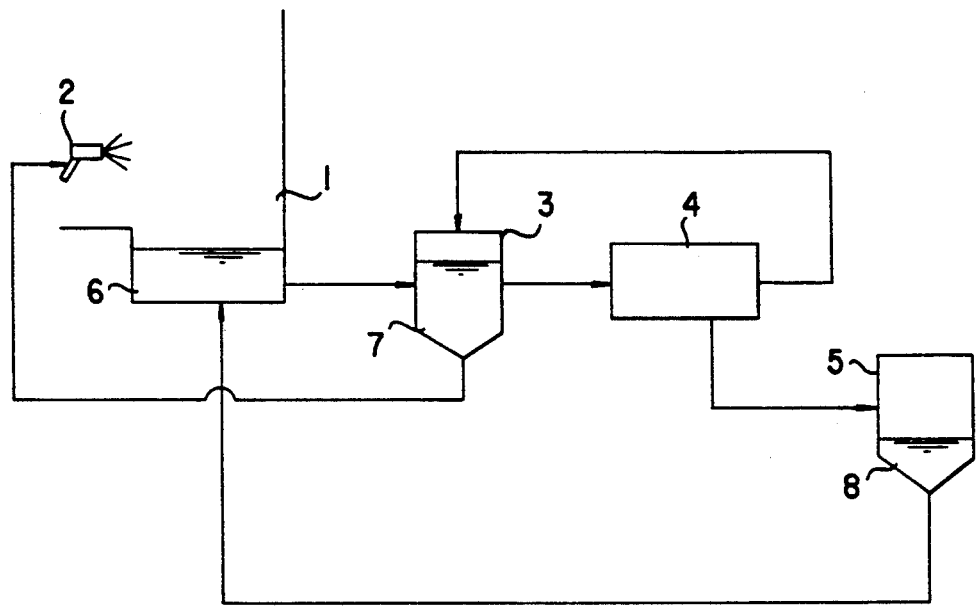
FIG. 1 is a schematic view illustrating a paint recovery system in which a paint of present invention is utilized.

The present invention will be now discussed in detail. The water-soluble resin included in the water-base to form a paint coating is selected from the group consisting of alkyd resin and acrylic resin and may be utilized either alone or in combination. The alkyd and acrylic resin is selected to have an acid value (AV) of 25 to 100, a hydroxyl value (OHV) of 35 to 200, and a solubility parameter (SP) of 10.0 to 11.0. With AV of less than 25, OHV of less than 35, or SP of less than 10.0, the alkyd and acrylic resin suffers from poor water solubility (hydrophilic extent) which may cause separation during condensation of the recovered paint composition. On the contrary, with AV of more than 100, OHV of more than 200, or SP of more than 11.0, the resin suffers from unduly high water solubility (hydrophilic extent) which may reduce water resistance in a resulting paint coat. Preferably, the alkyd and acrylic resin is selected to have AV of 40 to 70 and OHV of 60 to 150. Further, the alkyd resin is preferred to have an oil length of 45 or less.

The solubility parameter (SP) gives an index with respect to solubility of the resin [reference is made to publication by SUH, CLARKE in the publication "J.P.S. A-1", vol. 5, pages 1671–1681, 1967] and is determined through measurements made for a sample of the resin under the conditions below.

Conditions

Temperature: 20° C.
Good solvent: dioxane, acetone
Bad solvent: n-hexane, ion-exchanged water
Sample: prepared by adding 10 ml of good solvent by the use of a transfer pipet to 0.5 g of the resin in a 100 ml beaker to dissolve the resin by means of a magnetic stirrer.
Turbidimetric titration: dropping bad solvent to the sample for determination of a dropping amount at which turbidity occurs.
From the above measurement, the solubility parameter ($\delta$) is obtained by the following equation.

$$\delta = \frac{\sqrt{V_{ml}} \cdot \delta_{ml} + \sqrt{V_{mh}} \cdot \delta_{mh}}{\sqrt{V_{ml}} + \sqrt{V_{mh}}}$$

wherein $$V_m = \frac{V_1 \times V_2}{\phi_1 \times V_2 + \phi_2 \times V_1}$$

$$\delta_m = \phi_1 \times \delta_1 + \phi_2 \times \delta_2$$

Vi represents molecular volume of the individual solvents;

$\phi$i represents volume percent of the dropping amount of the individual solvents;

$\delta$i represents SP (solubility parameter) of the individual solvents;

ml indicates a mixture system utilizing the bad solvent with low SP; and mh indicates a mixture system utilizing the bad solvent with high SP.

The curing agent or cross-linking agent utilized in the paint composition of the present invention include amino resins such as melamine resin and benzoguanamine which is prepared to have solubility parameter (SP) higher than that of the water-soluble resin by a range of 0.5 to 3.0. By incorporation of the curing agent having the above specified solubility parameter (SP), it is possible to give hydrophobic property to a coating of the cured alkyd and acrylic resin, thereby enhancing coating property such as moisture resistance and hot water resistance. When the curing agent is selected to have solubility parameter (SP) which is higher than that of the resin only by 0.5 or less or to have solubility parameter (SP) which is lower than that of the resin, the resulting paint composition will suffer from poor stability and therefore cause separation. On the other hand, when the curing agent has solubility parameter (SP) which is higher than that of the resin by more than 3.0, the resulting paint composition is not expected to have enhanced coating properties with respect to moisture resistance, hot water resistance, and sagging resistance. Further, it is noted that since the water-based paint composition requires no addition of the thickening agent in emulsion, it can be substantially free from sagging at the time of forming the coat.

The water-based paint composition in accordance with the present invention may include, in addition to the water-soluble resin and curing agent, a pigment and water-soluble organic solvent. The pigment, which is preferred to be incorporated at a pigment volume concentration (PVC) of 0 to 35%, includes a coloring pigment such as titanium dioxide, carbon, and quinacridone, and an extender pigment such as calcium carbonate. Butyl cellosolve is utilizes as the organic solvent. The curing agent is incorporated in the alkyd and/or acrylic resin preferably in a proportion of 50:50 to 5:95 based upon the solid content.

The paint composition thus prepared is thinned with water for application as a water-thinned paint. When the paint is applied by spray coating on an article within a coating booth, a dust of the paint failing to deposit on the article and remaining suspended in the booth is recovered in flushing water by being dissolved and/or dispersed therein. The paint contained in the flushing water is collected by filtration so as to be condensed up to an original solid concentration for re-use.

FIG. 1 illustrates a paint recovery system for recycling the water-based paint applied in a coating boot 1 by means of a spray 2. A dust of undeposited paint remaining within the boot 1 is collected as being dissolved and/or dispersed in a flushing water 6 in the boot 1. As the spray coating continues, the concentration of the paint collected in the flushing water 6 becomes high accompanied with increased concentration of non-volatile content of the flushing water 6. Upon the non-volatile content of the flushing water 6 reaching a pre-determined level, the flushing water 6 is fed to a condenser tank 3 and stored therein as a water-diluted paint 7 which is thereafter filtrated through a filtration device 4 for condensation. The filtration device 4 may be an ultrafiltration device with an ultrafiltration membrane or a reverse osmosis device with a reverse osmosis membrane which is known in the art such as disclosed, for example, in Japanese patent non-examined early publication (KOKAI) No. 49-51324. The water-diluted paint thus condensed through the filtration device 4 is fed back to the condenser tank 3 as to be again fed to the filtration device 4 for filtration thereat. This condensation cycle repeats until the paint is condensed up to an original non-volatile concentration thereof, after which thus condensed paint is returned back for re-use in the spray coating through the spray 2. Filtrate 8 having separated through the filtration device 4 from the water-diluted paint 7 is collected in a filtrate tank 5 and is returned back for re-use as the flushing water in the boot 1.

It is noted here that since the water-based paint composition of the present invention incorporates the curing agent having solubility parameter (SP) which is higher than that of the alkyd and acrylic resin by a range of 0.5 to 3.0 in order to give hydrophobic property to the resulting coat and therefore enhance moisture resistance and hot water resistance thereof, it is possible to utilize the alkyd and acrylic resin of relatively great water solubility. With this result, the paint composition can be free from the resin separation as well as pigment coalescence even when the content of the water-soluble organic solvent is lowered during the condensation cycle, thereby leaving no substantial imbibition in the paint coating. In addition, since the paint composition of the present invention does not require to incorporate the thickening agent in emulsion for prevention of sagging, it is possible to greatly reduce the occurrence of abnormal coating problems with time.

As discussed in the above, the water-based paint composition can be recovered for re-use without causing the resin separation and pigment coalescence and therefore without lowering the coating properties. It should be noted here that during the condensation process of collecting the undeposited paint in the flushing water and filtrating the resulting water-diluted paint to remove the water therefrom, it may be advantageous to supplement the water-soluble organic solvent to the water-diluted paint in compensation for the solvent having been filtrated together with the water, as discussed below.

Figure 2:
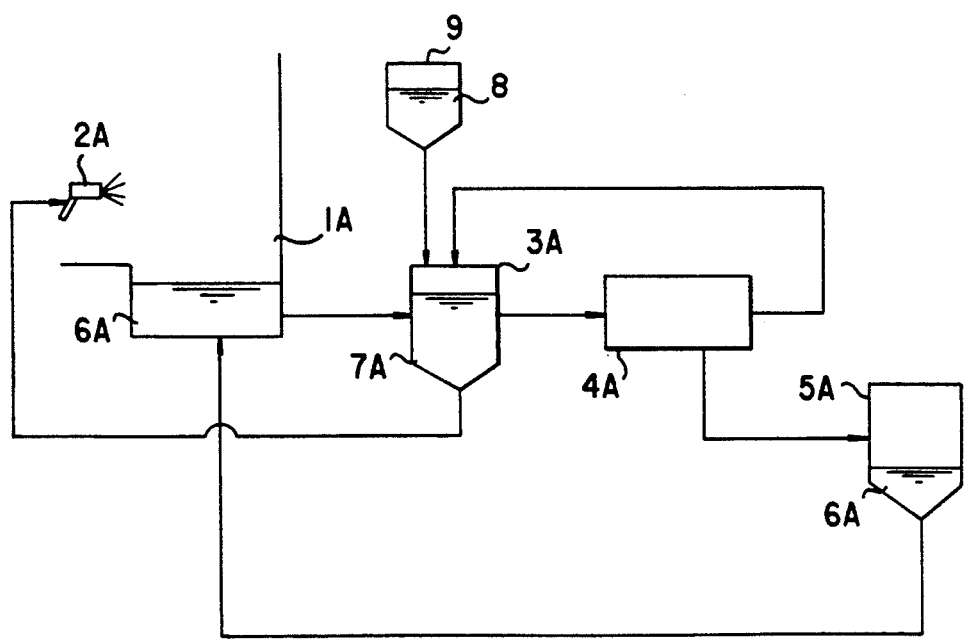
FIG. 2 is a schematic view illustrating another paint recovery system.

FIG. 2 illustrates another paint recovery system for recycling the water-based paint with capability of supplementing the water-soluble organic solvent. The system is identical in configuration to that of FIG. 1 except for inclusion of a solvent tank be. Like parts and objects are designated by like reference numerals with a suffix letter of "A". As in the system of FIG. 1, when the concentration of the paint collected in the flushing water 6A in a booth 1A becomes high, the flushing water 6A is fed to a condenser tank 3A and is stored therein as a water-diluted paint 7A which is thereafter filtrated by means of a filtration device 4A. During the filtration of the water-diluted paint through the filtration device 4A for condensation thereof, the water-soluble organic solvent such as butyl cellosolve contained in the paint composition will pass through the filtration device 4A together with the water so as to be removed from the water-diluted paint. In compensation for the deficiency of the organic solvent, the system of FIG. 2 includes the solvent tank 10 in order to supplement the organic solvent 9 to the water-diluted paint in the tank 3A such that the water-diluted paint can be condensed as being supplied with the organic solvent 9. The organic solvent 9 may be supplied to the tank 3A continuously little by little or supplied intermittently each time the non-volatile content of the water-diluted paint increases to differing predetermined levels in order that the proportion of the organic solvent to the resin can be maintained at a level which is not far from that in the original paint composition. The supplement amount of the organic solvent may differ from the paint composition of differing content proportions and can be determined empirically for a specific paint composition. In this recovery system, therefore, the recovered paint composition can maintain the proportion of the organic solvent 9 to the water at the same level as the original by supplementing the organic solvent to the water-diluted paint, in addition to that the recovered paint composition is condensed to have the non-volatile content almost equal to that of the original paint composition. Thus recovered paint composition can be recycled in such a manner as to be returned back to the spray 2A for re-use.

With this process of maintaining the content of the organic solvent in the recovered paint composition at around the original level, the resin can be well prevented from becoming dispersed in the paint composition rather than being kept dissolved therein which might otherwise occur. This is effective to prevent the pigment coalescence and separation of the paint composition, improving to assure the resulting paint coat free from imbibition. Although the paint composition of the present invention is prepared to prevent pigment coalescence as well as separation of the paint composition even with the lowered content of the organic solvent, the above scheme of supplementing the organic solvent in the paint composition being recovered is preferred to still improve the coating property in preventing the pigment coalescence and separation of the paint composition. It is noted in this connection that if and once the separation of the paint composition should occur during the condensation of the paint composition being recovered, although it is not likely with the paint composition of the present invention, the paint composition is difficult to be restored into a uniform condition of dissolving the resin in the water even with the later addition of the organic solvent. In this respect, it is mostly preferred to supplement organic solvent to the paint composition during the condensation of the paint composition and not after the condensation when it is required to supplement the organic solvent. Incidentally, it is to be understood that the above recovery system can be successfully adapted to recover any water-soluble paint compositions for spray coating application other than that of the present invention in order to prevent pigment coalescence and separation of the paint composition.

The following Examples are further illustrative of the present invention. All parts and percentages are on a weight basis unless otherwise indicated.

EXAMPLE 1

The following components were placed in a vessel provided with a stirrer, a thermo-controller, and a decanter followed by being stirred with the application of heat.
35 parts of soybean oil fatty acid;
25 parts of isophthalic acid;
9 parts of trimellitic anhydride;
31 parts of trimethylolpropane;
1 parts of xylene; and
0.02 parts of dibutyltin oxide Water produced as the reaction proceeded was removed by azeotropic distillation with xylene and heat was continuously applied until a resulting resin had an acid value of 50 and a hydroxyl value of 125. The resin was then diluted with butyl cellosolve to obtain alkyd resin varnish having a solid content of 73 wt %. Thus obtained alkyd resin varnish was found to have a Gardner viscosity of Z2 and a solubility parameter (SP) of 10.37. The resin varnish was neutralized 100% theoretically with dimethylethanolamine and was added with demineralized water to prepare water-soluble alkyd resin varnish A having a non-volatile content of 40 wt %.

Thereafter, titanium dioxide and silica was dispersed into the alkyd resin varnish A within a stainless-steel vessel by the use of a laboratory mixer. Also methanol ethanol-denatured benzoguanamine of SP=11.47 was dispersed in the resin varnish to prepare a water-based paint composition having the components in listed proportions in Table 1.

EXAMPLE 2

A water-based paint composition was prepared in the identical manner as in Example 1 except that a curing agent of methanol butanol-denatured melamine resin of SP=11.90 was utilized instead.

EXAMPLE 3

The following components were placed in a vessel provided with a stirrer, a thermo-controller, and a cooler followed by being stirred at 120° C. to obtain a mixture.
76 parts of ethylene glycol monobutyl ether;
61 parts of monomer solution composed of:
122 parts of styrene;
66 parts of lauryl methacrylate;
23 parts of methacrylic acid; and
3 parts of azobis isobutyronitrile.

Then, another 245 parts of the monomer solution of the same proportion was dropped into the mixture over 3 hours followed by being stirred for 1 hour. Thereafter, 24 parts of dimethylethanolamine and 200 parts of demineralized water were added to prepare a water-soluble acrylic resin varnish B having a non-volatile content of 50% and an average resin molecular weight of 6000. Thus obtained resin varnish B was found to have an acid value of 50, a hydroxyl value of 95, and SP of 10.5.

Thereafter, titanium dioxide and silica was dispersed into the acrylic resin varnish B within a stainless-steel vessel by the use of a laboratory mixer. Also methanol ethanol-denatured benzoguanamine of SP=11.47 was dispersed in the resin varnish to prepare a water-based paint composition having the components in listed proportions in Table 1.

COMPARATIVE EXAMPLES 1 to 3

The curing agents listed in Table 2 were added in listed proportions to the water-soluble alkyd resin varnish A of Example 1 within a stainless-steel vessel with the titanium dioxide and silica dispersed therein by the use of a laboratory mixer to prepare individual water-soluble paint compositions.

COMPARATIVE EXAMPLE 4

The following components were placed in a vessel provided with a stirrer, a thermo-controller, and a decanter followed by being stirred with the application of heat.

30 parts of isophthalic acid;
5 parts of trimellitic anhydride;
27 parts of Hatall FA-1; #1)
15 parts of trimethylolpropane;
11 parts of neopentylglycol;
5 parts of BAP8 Glycol; #2)
5 parts of PPG1000; #3
2 parts of xylene
1) talloil fatty acid available from HARIMA KASEI CO., LTD. Japan;
2) addition product of bisphenol A and propylene oxide available from NIPPON NYUKAZAI CO., LTD. Japan;
3) polypropylene glycol having molecular weight of about 1000 available from SANYO KASEI CO., LTD. Japan Water produced as the reaction proceeded was removed by azeotropic distillation with xylene and heat was continuously applied until a resulting resin had an acid value of 30 and a hydroxyl value of 40. The resin was then diluted with butyl cellosolve to obtain alkyd resin varnish having a solid content of 73 wt %. Thus obtained alkyd resin varnish was found to have a Gardner viscosity of Z2 to Z3 and a solubility parameter (SP) of 10.50. The resin varnish was neutralized 100% theoretically with triethylamine and was added with demineralized water to prepare water-soluble alkyd resin varnish C having a non-volatile content of 40 wt %.

Thereafter, titanium dioxide and silica was dispersed into the alkyd resin varnish C within a stainless-steel vessel by the use of a laboratory mixer. Also methanol-denatured melamine resin was dispersed in the resin varnish to prepare a water-based paint composition having the components in listed proportions in Table 2.

TABLE 1

| Component: by weight parts | Example 1 | Example 2 | Example 3 |
|---|---|---|---|
| water-soluble alkyd resin varnish A | 108 | 108 | — |
| water-soluble acrylic resin varnish B | — | — | 86 |
| titanium dioxide | 100 | 100 | 100 |
| silica #4) | 2.5 | 2.5 | 2.5 |
| methanol.ethanol-denatured benzoguanamine #5) | 11 | — | 11 |
| methanol.butanol-denatured melamine resin #6) | — | 14 | — |

TABLE 1-continued

| Component: by weight parts | Example 1 | Example 2 | Example 3 |
|---|---|---|---|

4) available from NIPPON SILICA CO., LTD. Japan under the trade name of "Nipseal SS-170X"
5) available from MITSUI CYANAMID, LTD. Japan under the trade name of "Cymel 1123" (100% non-volatile content and SP = 11.47)
6) available from MITSUI CYANAMID, LTD. Japan under the trade name of "Cymel 325-101" (80% non-volatile content and SP = 11.90)

TABLE 2

| Component: by weight parts | Comparative Example 1 | Comparative Example 2 | Comparative Example 3 | Comparative Example 3 |
|---|---|---|---|---|
| water-soluble alkyd resin varnish A | 108 | 108 | 108 | — |
| water-soluble acrylic resin varnish C | — | — | — | 108 |
| titanium dioxide | 100 | 100 | 100 | 100 |
| silica | 2.5 | 2.5 | 2.5 | 2.5 |
| butanol-denatured melamine resin #7) | 18 | — | — | — |
| methanol-denatured melamine resin #8) | — | 11 | — | — |
| methanol-denatured melamine resin #9) | — | — | 14 | 14 |

7) available from MITSUI TOATSU CHEMICALS, INC. Japan under the trade name of "Uban 20SE-60" (60% non-volatile content and SP = 9.74)
8) available from MITSUI CYANAMID, LTD. Japan under the trade name of "Cymel 303" (100% non-volatile content and SP = 13.84)
9) available from SUMITOMO KAGAKU KOGYO CO., LTD. Japan under the trade name of "Sumimale 50W" (78% non-volatile content and water soluble)

Performance test of water-soluble paint compositions

The paint compositions obtained in Examples 1 to 3 and Comparative Examples 1 to 4 were diluted with water to such an extent that the resulting water solution of the paint composition can be thoroughly flown out of an efflux cup NK#2 in 50 sec. Thus water-thinned paint compositions were each applied by spraying onto a 0.8 mm thick steel plate phosphatized with zinc phosphate (available from Nippon Test panel, Japan) and was baked for 20 minutes at 160° C. to form a coat having a dry thickness of 25 to 30 μm. Then, tests were made to the individual coats with respect to hot-water resistance (by exposure to boiled water for 0.5 hours) and impact strength by the use of Du pont impact tester. Also, the paint compositions were tested with respect to paint stability after being left stood at 40° C. for 30 days. Impact test was made by dropping a 0.5 in. diameter and 50 g steel ball onto the coat from differing heights in such a manner as to cause crack in the coat. The impact strength is expressed in terms of the height below which no substantial crack is seen, and is evaluated to confer strong impact resistance at the height of more than 30 cm. As to the paint stability, the paint composition is evaluated as "good" when no separation of the resin occurs after the elapse of 30 days. The test results are shown in Tables 3 and 4.

Further, the paint compositions obtained in Examples 1 to 3 and Comparative Examples 1 to 4 were diluted with demineralized water to such an extent that the resulting water solution of the paint composition can be thoroughly flown out of an efflux cup NK#2 in 60 sec. Thus water-thinned paint compositions were each applied by spraying onto a 0.8 mm thick steel plate phosphatized with zinc phosphate (available from Nippon Test panel Co., Ltd. Japan) with the plate held upright to form thereon a wet coat of gradually varying thickness. The wet coat was then set for 20 minutes followed by being baked at 160° C. for 20 minutes to form a dry coat having a thickness which varies in a stepwise manner from 20μ to 70μ. During this process, observation was made to determine a maximum thickness above which sagging occurs for each coat. The results are shown in Tables 3 and 4.

Performance test 1 for the paint composition recovered and condensed from the flushing water in a coating booth The water-soluble paint compositions of Examples 1 to 3 as well as Comparative Examples 1 to 4 were applied by means of the spray 2 onto an article within a coating boot 1 in accordance with the system of FIG. 1 in which dust of undeposited paint was collected by a flushing water 6. When the flushing water 6 becomes condensed with the paint composition to have a non-volatile content of 15 wt % as a result of the paint was dissolved and/or dispersed in the flushing water, the flushing water 6 was fed from the boot 1 to the condenser tank 3 as the water-diluted paint 7. Then, the diluted paint 7 was fed to the filtration device 4 having a ultrafiltration membrane available from Desalination systems, Inc, U.S.A. under the trade name of "EW4026" through which the diluted paint 7 was filtrated for condensation to obtain a condensed paint having a non-volatile content of 55 wt %. The filtrate from the filtration device 4 was collected into the tank 5 and returned back to the boot 1. Thus recovered and condensed paint was supplied to the spray 2 for re-use of the paint for application on an article in the like condition as in the previous test to form a coat of 25μ to 30μ dry thickness, Observation was made to see whether separation of resin occurs in thus recovered paint composition as well as to check the appearance of the resulting coat with regard to each of Examples 1 to 3 and Comparative Examples 1 to 4. The results are shown in Tables 3 and 4.

TABLE 3

|  | Example 1 | Example 2 | Example 3 |
|---|---|---|---|
| SP of water-soluble resin (1) | 10.37 | 10.37 | 10.5 |
| SP of curing agent (2) | 11.47 | 11.90 | 11.47 |
| (2) − (1) | 1.1 | 1.53 | 0.97 |
| hot water resistance | good | good | good |
| impact strength | 35 cm | 40 cm | 35 cm |
| paint stability | good | good | good |
| maximum coating thickness | 53 μm | 50 μm | 51 μm |

TABLE 3-continued

|  | Example 1 | Example 2 | Example 3 |
|---|---|---|---|
| without causing sagging ultrafiltration condensation |  |  |  |
| paint condition | good | good | good |
| coating appearance | good | good | good |

TABLE 4

|  | Comparative Example 1 | Comparative Example 2 | Comparative Example 3 | Comparative Example 4 |
|---|---|---|---|---|
| SP of water-soluble resin (1) | 10.37 | 10.37 | 10.37 | 10.50 |
| SP of curing agent (2) | 9.74 | 13.84 | water soluble | water soluble |
| (2) − (1) | −0.63 | 3.47 | — | — |
| hot water resistance | good | unacceptable | unacceptable | good |
| impact strength | 35 cm | 25 cm | 25 cm | 30 cm |
| paint stability | resin separation | good | good | good |
| maximum coating thickness without causing sagging ultrafiltration condensation | — | 38 μm | 36 μm | 36 μm |
| paint condition | resin separation | good | good | resin separation |
| coating appearance | imbibition appeared | good but insufficient hardness | good but insufficient hardness | imbibition appeared |

As seen from Tables 3 and 4, it is confirmed that the water-soluble paint compositions of Examples 1 to 3 exhibit superior coating performance as well as paint stability and also that the recovered paint compositions of these Examples are all found to exhibit equally superior coating performance as well as paint stability free from resin separation even utilized for re-use.

In contrast, with regard to the alkyd resin paint composition of Comparative Example 1 in which the curing agent is selected to have SP which is lower than that of the alkyd resin, it is observed that resin separation occurs even in the original paint composition to spoil paint stability and also that resin separation is seen in the paint being recovered for re-use. Further, the coat of the recovered paint is found to suffer from unacceptable imbibition.

As to the alkyd resin paint composition of Comparative Example 2 incorporating the curing agent having SP which is higher than that of the alkyd resin by more than 3.0, poor coating performance is found in sagging resistance as well as in hot water resistance of the coat by the original paint and insufficient hardness is found in the coat by the recovered paint.

As to the alkyd resin paint composition of Comparative Example 3 incorporating the curing agent which is soluble in water, poor coating performance is found likewise as in Comparative Example 2.

As to the acrylic resin paint composition of Comparative Example 4, it is found that the recovered paint shows resin separation and causes imbibition in the coat thereof.

Performance test 2 for the paint composition recovered and condensed from the flushing water in a coating booth The alkyd resin paint composition of Example 1 was diluted with water to have a non-volatile content of 55 wt % to prepare a fresh paint for spray coating within the coating boot 1A in accordance with the system of FIG. 2 which utilizes the flushing water 6A prepared by mixing butyl cellosolve with ion-exchanged water at a weight proportion of 2:98. When the flushing water 6A becomes condensed with the paint to have a non-volatile content of 15 wt % as a result of the paint was collected in the flushing water 6A, the flushing water 6A was fed from the booth 1A to the condenser tank 3A as the water-diluted paint 7A. Then, the diluted paint 7A was fed to the filtration device 4A having a ultrafiltration membrane available from Desalination systems under the trade name of "EW4026" through which the diluted paint 7A was filtrated for condensation. When the diluted paint 7A was condensed to have a non-volatile content of 30 wt %, butyl cellosolve was supplemented to the diluted paint 7A at a proportion of 1.0 weight part to 100 parts of the diluted paint 7A and the condensation continued until the paint was condensed up to 40 wt % non-volatile content. Then, butyl cellosolve was again supplemented at a proportion of 1.8 parts to 100 parts of the diluted paint and the condensation was continued until 50 wt % non-volatile content was reached. Then, butyl cellosolve was further supplemented at a proportion of 1.0 part to 100 parts of the paint and the condensation was continued until 55 wt % non-volatile content was reached.

In addition, the alkyd resin paint composition of Example 3 is diluted with water to have a non-volatile content of 55 wt % to prepare a fresh paint which was applied by spray-coating within the coating booth 1A with the use of the like flashing water 6A for collecting the paint dust. The flashing water 6A was condensed by filtration to have a non-volatile content of 55 wt % while it was supplemented with butyl cellosolve in the like manner as in the above.

The fresh paint compositions and thus recovered paint compositions of Examples 1 and 3 were analyzed by gas-chromatography with respect to weight ratio of the organic solvent, i.e., butyl cellosolve contained in each paint composition, and also observed with respect to the paint condition as to whether resin separation occurs or not. Further, the fresh and recovered paint compositions of Examples 1 and 3 were each applied by spray-coating onto a 0.8 mm thick steel plate phosphatized with zinc phosphate (available from Nippon Test panel Co., Ltd. Japan) and was baked for 20 minutes at 160° C. to form a coat having a dry thickness of 25 to 30 μm. The individual coats thus formed were tested with respect to appearance in terms of 60° gloss as well as to hot-water resistance and moisture resistance. The hot-water resistance was tested the conditions of exposing each coat to boiled water for 0.5 and 1.0 hour, respectively. The moisture resistance was tested under the conditions of exposing each coat to an environment of 100% relative humidity at 50° C. for 100 hours and 10 days, respectively. The test results are shown in Table 5.

TABLE 5

|  | Example 1 | | Example 3 | |
| --- | --- | --- | --- | --- |
|  | fresh paint | recovered paint | fresh paint | recovered paint |
| proportion (organic solvent/water) | 5/40 | 5/40 | 9/38 | 8.5/38.5 |
| paint condition | good | good | good | good |
| coat appearance (60° gloss) | 50 | 46 | 50 | 47 |
| hot-water resistance | | | | |
| 0.5 hour | good | good | good | good |
| 1.0 hour | good | good | good | good |
| moisture resitance at 50° C., ?? relative humidity | | | | |
| 100 hours | good | good | good | good |
| 10 days | good | good | good | good |

As seen from Table 5, it is confirmed that the recovered paints of Example 1 and 3 contains the same proportion of the organic solvent to the water as that of the fresh paint and exhibit no resin separation, and also that the coats formed from the recovered paints exhibit good coating properties.

What is claimed is:
1. A water-based paint composition comprising:
   a water-soluble resin selected from the group consisting of alkyd resin and acrylic resin to have an acid value of 25 to 100, a hydroxyl value of 35 to 200, and a solubility parameter (SP) of 10.0 to 11.0; and
   a curing agent having a solubility parameter (SP) which is higher than that of said water-soluble resin by 0.5 to 3.0.
2. A water-based paint composition as set forth in claim 1, wherein said curing agent is an amino resin.

* * * * *